United States Patent
Zucker et al.

(10) Patent No.: US 10,824,868 B2
(45) Date of Patent: Nov. 3, 2020

(54) IMAGE PROCESSING FOR DETERMINING RELATIONSHIPS BETWEEN TRACKED OBJECTS

(71) Applicant: NCR Corporation, Atlanta, GA (US)

(72) Inventors: Brent Vance Zucker, Roswell, GA (US); Adam Justin Lieberman, Suwanee, GA (US); Nathan Somavarapu, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 141 days.

(21) Appl. No.: 16/144,679

(22) Filed: Sep. 27, 2018

(65) Prior Publication Data

US 2020/0104595 A1 Apr. 2, 2020

(51) Int. Cl.
| | | |
|---|---|---|
| G06K 9/00 | (2006.01) | |
| G06N 20/00 | (2019.01) | |
| G06K 9/62 | (2006.01) | |
| G06Q 20/20 | (2012.01) | |

(52) U.S. Cl.
CPC ..... *G06K 9/00671* (2013.01); *G06K 9/00375* (2013.01); *G06K 9/6248* (2013.01); *G06N 20/00* (2019.01); *G06Q 20/208* (2013.01)

(58) Field of Classification Search
CPC ........... G06K 9/00671; G06K 9/00375; G06K 9/6248; G06N 20/00; G06Q 20/208
USPC .......................................... 382/103, 115, 132
See application file for complete search history.

(56) References Cited

U.S. PATENT DOCUMENTS

| | | | | |
|---|---|---|---|---|
| 7,667,604 | B2 * | 2/2010 | Ebert | G06Q 20/203 |
| | | | | 340/572.4 |
| 8,131,011 | B2 * | 3/2012 | Nevatia | G06K 9/00369 |
| | | | | 382/103 |
| 10,133,933 | B1 * | 11/2018 | Fisher | G06K 9/00718 |
| 10,474,988 | B2 * | 11/2019 | Fisher | H04N 17/002 |
| 10,474,992 | B2 * | 11/2019 | Fisher | G06N 3/0454 |
| 10,474,993 | B2 * | 11/2019 | Fisher | H04N 5/232 |
| 2008/0123968 | A1 * | 5/2008 | Nevatia | G06K 9/00369 |
| | | | | 382/228 |
| 2017/0220871 | A1 * | 8/2017 | Ikeda | G08B 25/00 |
| 2018/0276471 | A1 * | 9/2018 | Shibata | G06K 9/00671 |
| 2018/0336672 | A1 * | 11/2018 | Perticone | G06K 9/00624 |
| 2019/0026543 | A1 * | 1/2019 | Ozaki | G06K 9/00268 |
| 2019/0042988 | A1 * | 2/2019 | Brown | G06F 16/9535 |
| 2019/0043003 | A1 * | 2/2019 | Fisher | G06K 9/6274 |
| 2019/0156274 | A1 * | 5/2019 | Fisher | G06K 9/00335 |
| 2019/0156275 | A1 * | 5/2019 | Fisher | H04N 5/232 |
| 2019/0205657 | A1 * | 7/2019 | Ikeda | G06K 9/00342 |
| 2019/0205658 | A1 * | 7/2019 | Ikeda | G06K 9/00342 |
| 2019/0278976 | A1 * | 9/2019 | Khadloya | G06K 9/4614 |
| 2019/0361590 | A1 * | 11/2019 | Chan | G06F 16/54 |

(Continued)

OTHER PUBLICATIONS

Wojke, Nicolai, et al., "Simple Online and Realtime Tracking with a Deep Association Metric", 2017 IEEE International Conference on Image Processing (ICIP), (Sep. 2017), 5 pages.

*Primary Examiner* — Marceau Milord
(74) *Attorney, Agent, or Firm* — Schwegman, Lundberg & Woessner (57) ABSTRACT

Cameras capture time-stamped images of predefined areas. The images are processed to make decisions as to when a person depicted in the images takes possession of or is disposed of an item depicted in the images. Possessed items are added to a shopping cart maintained for the person and dispossessed items are removed from the shopping cart.

10 Claims, 4 Drawing Sheets

(56) References Cited

U.S. PATENT DOCUMENTS

2019/0385173 A1* 12/2019 Johnsen ............. G06K 9/00288
2020/0069175 A1* 3/2020 Kumagai ................. A61B 3/10
2020/0074393 A1* 3/2020 Fisher ...................... G06T 7/85

* cited by examiner

IMAGE PROCESSING FOR DETERMINING RELATIONSHIPS BETWEEN TRACKED OBJECTS

BACKGROUND

Computer vision and image processing techniques have advanced in recent years. However, one difficult and unsolved processing task includes knowing when to associate one tracked item with another tracked item.

This has been particularly difficult in frictionless store systems where decisions have to be made from the images as to whether an item should or should not be placed in an online shopping cart being maintained for a tracked shopper. Essentially, determining whether a shopper is possessing an item or not has been extremely challenging.

SUMMARY

In various embodiments, methods and a system for image processing to determine relationships between tracked objects are presented.

According to an embodiment, a method for image processing to determine relationships between tracked objects is presented. An image that depicts an individual and an item is received. Attributes associated with the individual and the item are obtained, and a determination is made as to whether, based on processing the image with the attributes, the individual is in possession of the item.

DETAILED DESCRIPTION

Figure 1:
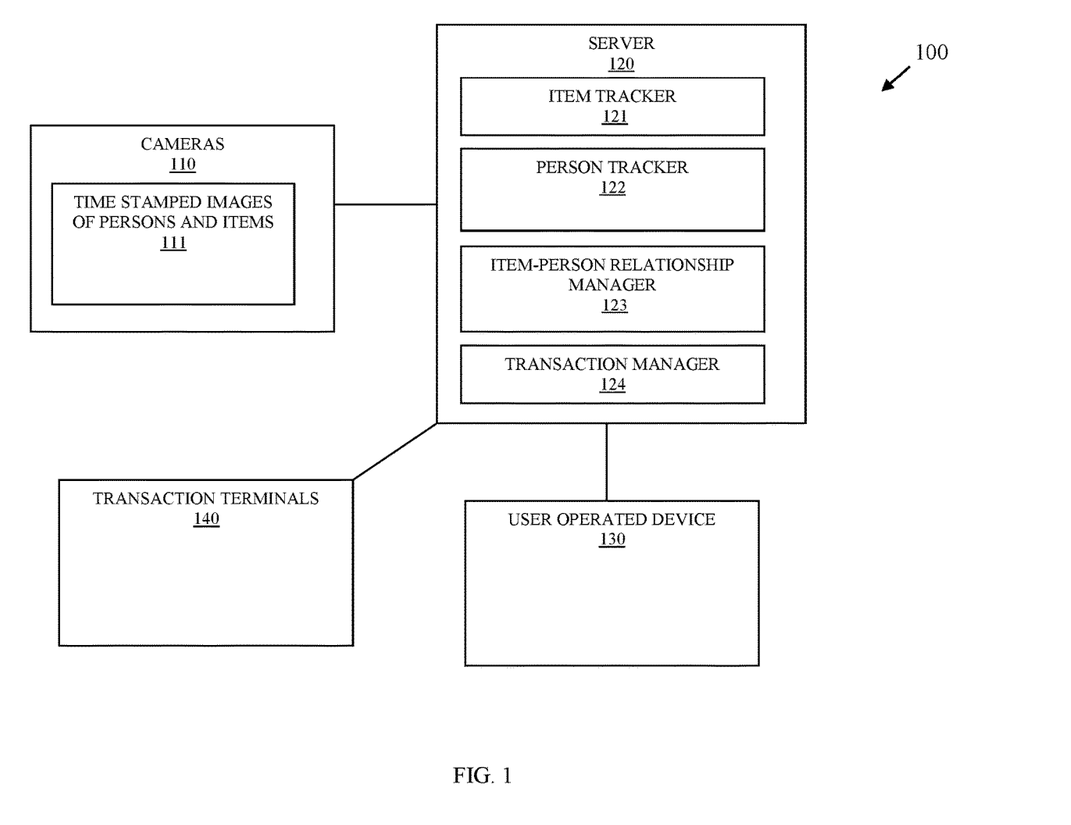
FIG. 1 is a diagram of a system for image processing to determine relationships between tracked objects, according to an example embodiment.

FIG. 1 is a diagram of a system 100 for image processing to determine relationships between tracked objects, according to an example embodiment, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of image processing to determine relationships between tracked objects, presented herein and below.

As used herein and below, the terms "customer," "consumer," and "user" may be used interchangeably and synonymously.

The system 100 includes a plurality of cameras 110 that capture time-stamped images of persons and items (herein after just "images 111"). The system 100 may include a user-operated device 130 and one or more transaction terminals 140. The server 120 includes executable instructions that execute on one or more hardware processors of the server 120 from a non-transitory computer-readable storage medium as: an item tracker 121, a person tracker 122, an item-person relationship manager 123, and a transaction manager 124.

It is to be noted that although not illustrated in the FIG. 1, the server 120 also includes one or more hardware processors, volatile and non-volatile memory, non-volatile storage, and networking circuitry (such as wired ports and/or wireless transceivers).

It is also to be noted that there may be multiple servers, such that the different elements 121-124 may execute on a same server 120 or multiple different servers networked together.

When a customer enters a store or is outside the store in the parking lot, cameras 110 begin capturing the time-stamped images 111 in frames. In an embodiment, the cameras 110 capture images at a rate of 20 to 30 frames per second.

The cameras 110 are preconfigured to capture images 111 of the defined areas based on the field-of-view of the lenses of the cameras 110. Some of the cameras 110 may capture images 111 representing portions of a different area that a different one of the cameras 110 captures images 111 for. That is, each image 111 can include pixel values that overlap multiple ones of the defined areas.

Initially, the cameras 110 are situated in locations throughout an enterprise (such as a retail store but can be other enterprises or even a consumer's home). Each camera lens configured to cover one or more predefined areas of the physical space of the enterprise.

Furthermore, metadata is assigned to each camera 110 to include a unique camera identifier, a location identifier (representing the physical location that the camera 110 is situated within the enterprise, and one or more area identifiers (representing the predefined areas that the lens of the camera 110 captures in the images 111).

Each camera 110 provides time stamp and frame stamped images to the server 120. These images can be streamed over a wired or wireless connection between the cameras 110 and the server 120 to a commonly accessible storage area on the server 120 that is accessible to the item tracker 121, the person tracker 122, and the item-person relationship manager 123. In an embodiment, some of the images when streamed from the cameras 110 can be buffered or cached in memory of cache and made accessible from the memory or cache to the item tracker 121, the person tracker 122, and the item-person relationship manager 123.

Each accessible image 111 includes its metadata (minimally including what was discussed above) with its image 111 on the server 120.

The person tracker 122 processes the pixels of the images to identify a unique person (the actual identity of the person can be unknown but the person tracker identifies that a person is in the time-stamped images 111). Attributes for the unique person are identified as metadata that permit the person tracker 122 to quickly and accurately identify the unique person as that person travels through the store and exits the store from the time-stamped images 111. Attributes can include clothing type, color, height, width, shoes, extremity features, eye glasses (sun glasses), hats, eye color, etc. A bounding box is placed around the unique person with the generated metadata. As more images 111 are captured from the cameras 110, the additional attributes can be added to the metadata, some existing attributes can be modified as modified metadata, some existing attributes initially believed to be associated with the person can be removed as deleted metadata. The person tracker 122 may also have its own machine-learning algorithm that is trained over time, such that the types of attributes represented in the metadata changes or the pixel information associated with particular metadata is changed. In this way, the accuracy of the person tracker 122 improves with time as does the processing throughput associated with producing the metadata representing the attributes from the images 111.

In an embodiment, the person tracker 122 is configured with facial recognition to obtain an identity of a person being tracked from the images.

In a similar manner, the item tracker 121 identifies from the images 111 items that are handled by the people being tracked by the person tracker 122. That is, the item tracker 121 receives the images, crops off pixels that are known to not be associated with the item (such as the pixels associated with background objects or a person). Each item includes a unique identifier for tracking even though the actual item may be unknown or unrecognized from the images. That is, (and similar to the person tracker 122), an item identity (such as the item's description, actual item barcode level of detail, etc.) is unknown in the time-stamped frames but is still assigned and associated with a unique tracking identifier in the frames/images 111 so as to distinguish between other unknown items of the store or other unknown items possessed by the customer. Again, attributes associated with the unknown item is carried as metadata from frame 111 to frame, so that the item tracker 121 can quickly identify and crop from later-in-time received images 111 the specific pixels or bounding box being tracked for the unknown item. Attributes can include, color, height, width, edges, bottle shape, item label or packaging characteristics, can shape, box shape, undefined shape, edges, etc.

The item tracker 121 is further configured to report to the transaction manager 124 when a previously unknown and tracked item is identified by the item tracker 121. That is, each item is tracked regardless as to whether it is a known item or an unknown item. Once the item tracker 121 has enough information from the images 111 to make a decision as to an identity for an item (item barcode level of detail), the item tracker 121 immediately reports the item identity to the transaction manager 124.

The item-person relationship manager 123 makes decisions as to when to associate a known or unknown tracked item provided by the item identifier 121 to a known or unknown tracked person provided by the person tracker 122. The item-person relationship manager 123 also makes decisions as to when to disassociate a known or unknown tracked item with a known or unknown tracked person.

The item-person relationship manager 123 provides an item tracking identifier for an item (known or unknown but a unique tracking identifier) and an indication as to whether to link (or delink (disassociate)) that item tracking identifier with a person (known or unknown but a unique person tracking identifier). The item-relationship manager 123 provides the item and person tracking identifiers and an indication to link (or delink) to the transaction manager 124.

The transaction manager 124 maintains a unique shopping cart for each person being tracked by the person tracker 122. The shopping cart includes all of the item identifiers (known or unknown depending on any give state of the processing performed by the item identifier 121) for the person being tracked.

The item-person relationship manager 123 is configured to utilize a human pose (limbs and limb position) deep learning trained machine-learning algorithm. The item tracker 121 provides a bounding box for the items within a given processed frame (image 111), similarly, the person tracker 122 provides a bounding box for persons tracked within a given processed frame. The machine-learning algorithm is configured to make decisions as to when a given bounding box for an item intersects a given bounding box for an item. The bounding boxes are pixel coordinates (x-axis minimum and maximum and y-axis minimum and maximum) within a given frame (image 111).

The machine-learning algorithm is also trained to estimate all limbs of a given person within the person bounding box. When a limb of the person is detected as intersecting with a bounding box for the item within a given frame, the machine-learning algorithm returns the item tracking identifier and the person tracking identifier and an indication to indicate whether the item is to be estimated to be in possession of the person tracking identifier or to be estimated to have been disposed by the person.

In cases, where the item tracking identifier's bounding box and an estimated limb of a person tracking identifier do not overlap, the machine-learning algorithm is trained and configured to compute the Euclidean distance between all pairs of the person tracker identifiers' bounding boxes and the bounding box of the item tracking identifier. When a minimum configured distance meets a specified threshold than the corresponding person tracker identifier that meets the threshold distance is assigned as having a possession relationship with that item tracking identifier.

As an example, assume that two or more individuals are detected as having a same Euclidean distance (through the bounding boxes) to a given item's bounding box. The machine-learning algorithm utilizes the limb estimation processing to detect when a limb of a given person is touching the item and optionally computes the Euclidean distance between the limb of that person and the item, when such distance meets or is below the preconfigured threshold distance, the machine-learning algorithm is trained to return the person tracking identifier and the item tracking identifier along with a possession indication.

In a similar manner, dispossession of the item can be determined based on a previous known association between a given person to a given item known and recorded by the item-person relationship manager 123. That is, when a person is known to have possessed a particular item and the given image is processed showing that the item is no longer in possession of the person (bounding box are now not intersecting or are at a greater distance than the minimum threshold distance), the item-person relationship manager 123 can note the disassociation (dispossession).

The corresponding person tracking identifiers and item tracking identifiers along with the possession or dispossession indications are provided by the item-person relationship manager 123 to the transaction manager 124. The transaction manager uses this information to locate a shopping cart assigned to the person tracking identifier and updates the shopping cart by adding or removing an already present item tracking identifier from a list of item identifiers that are included in the cart.

The transaction manager 124 can check out any given person in a variety of manners. When the person tracker 122 has identified a customer and the customer is pre-registered with the store and has a registered payment method, then the transaction manager can process that payment method when the person is identified by the person tracker 122 as approaching or leaving an egress point of the store. When the person tracker 122 was unable to obtain the identity of the person, the person can check out at a transaction terminal 140; the transaction manager 124 interacts with an agent process on the transaction terminal 140 and provides the shopping cart items for payment when the person tracker 122 identifies the person as being present at the transaction terminal 140. When the person (identified or unidentified) has a mobile application downloaded to the person's user device 130, the transaction manager interacts with the mobile application to present the items in the shopping cart and obtain payment from the person. Other approaches for checkout may be used as well, where the transaction manager 124 and the person tracker 122 cooperate to obtain payment for known persons (identity known) and for unknown persons (identity unknown).

In an embodiment, the system utilizes an object-based recognition and tracking within images, such that some embodiments of the invention are not restricted to relationships between an item and a person; rather any pair or set of objects can be tracked from frame to frames within images and the item-person relationship manager 123 can be configured to provide determinations as to relationships between the objects. Here, the objects represent real-world structures that are depicted within the images.

In an embodiment, the transaction terminal 140 is one or more of: A Point-Of-Sale (POS) terminal and a Self-Service Terminal (SST).

In an embodiment, the user-operated device 130 is one or more of: a phone, a tablet, a laptop, and a wearable processing device.

These embodiments and other embodiments are now discussed with reference to the FIGS. 2-4.

Figure 2:
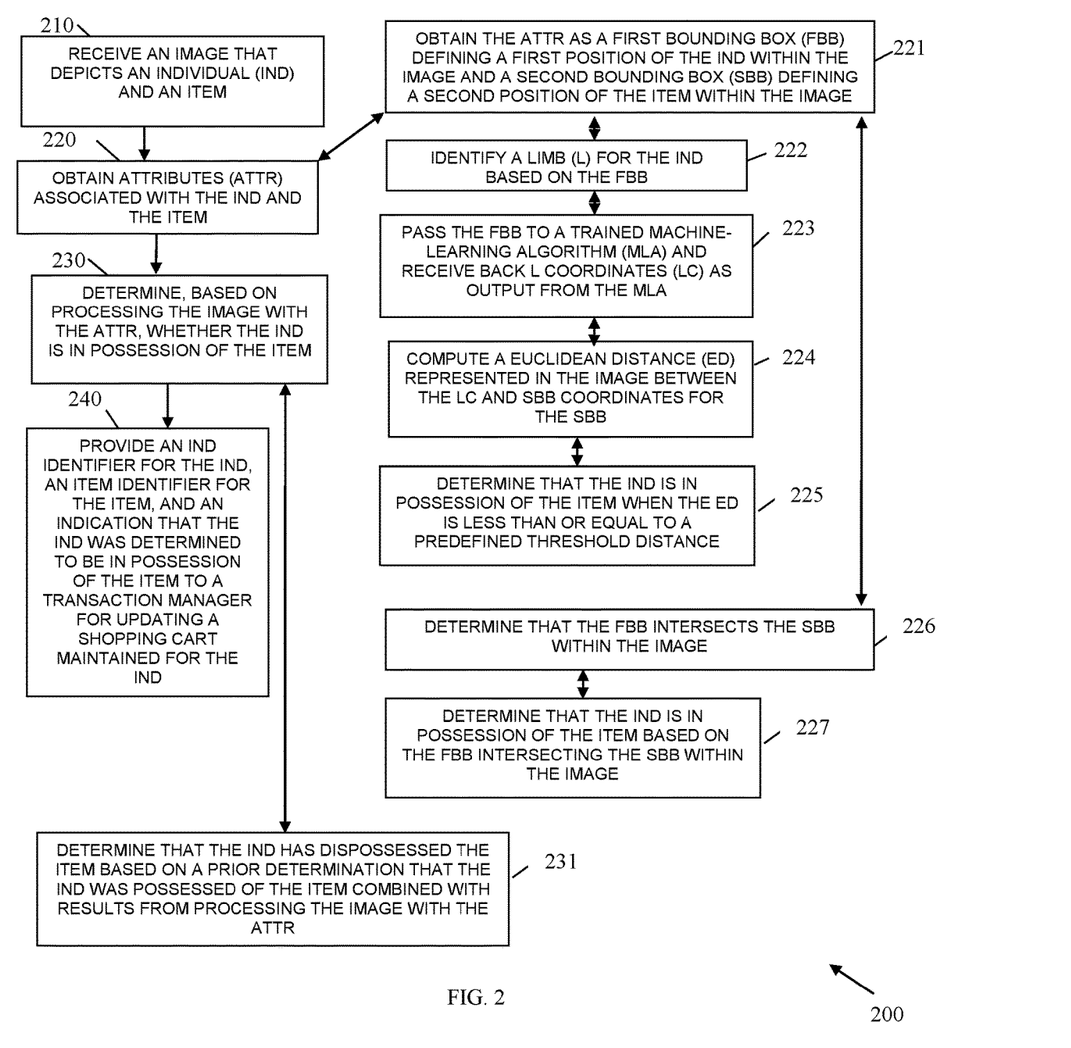
FIG. 2 is a diagram of a method for image processing to determine relationships between tracked objects, according to an example embodiment.

FIG. 2 is a diagram of a method 200 for image processing to determine relationships between tracked objects, according to an example embodiment. The software module(s) that implements the method 200 is referred to as a "relationship manager." The relationship manager is implemented as executable instructions programmed and residing within memory and/or a non-transitory computer-readable (processor-readable) storage medium and executed by one or more processors of a device. The processor(s) of the device that executes the relationship manager are specifically configured and programmed to process the relationship manager. The relationship manager has access to one or more network connections during its processing. The network connections can be wired, wireless, or a combination of wired and wireless.

In an embodiment, the device that executes the relationship manager is the server 120. In an embodiment, the server 120 is a cloud-based server.

In an embodiment, the relationship manager is all or some combination of: the item tracker 121, the person tracker 122, the item-person relationship manager 123, and the transaction manager 124.

At 210, the relationship manager receives an image that depicts within the pixels of the image an individual and an item.

At 220, the relationship manager obtains attributes associated with both the individual and the item. The attributes providing pixel values and/or coordinates for identifying both the individual and the item from the image pixels. In an embodiment, the attributes associated with the item are provided by the item tracker 121 and the attributes associated with the individual are provided by the person tracker 122.

In an embodiment, at 221, the relationship manager obtains first attributes as a first bounding box defining borders within the image that define a first position within the image for identifying the individual. The relationship manager also obtains second attributes as a second bounding box defining borders within the image that define a second position within the image for identifying the item.

In an embodiment of 221, at 222, the relationship manager identifies a lib for the individual based at least in part on the first bounding box, the limb depicted within the image as pixel values.

In an embodiment of 222, at 223, the relationship manager passes the first bounding box to a trained machine-learning algorithm and receives back limb coordinates for the limb depicted within the image. The limb coordinates received as output produced by the machine-learning algorithm.

In an embodiment of 223, at 224, the relationship manager computes a Euclidean distance represented in the image between the limb coordinates and second bounding box coordinates for the second bounding box that represents the item in the image.

In an embodiment of 224, at 225, the relationship manager determines that the individual is in possession of the item when the Euclidean distance is less than or equal to a predefined threshold distance.

In an embodiment of 221, at 226, the relationship manager determines that the first bounding box for the individual at least partially intersects the second bounding box for the item within the image.

In an embodiment of 226, at 227, the relationship manager determines that the individual is in possession of the item based on the first bounding box for the individual intersecting the second bounding box for the item within the image.

At 230, the relationship manager determines, based on processing the image with the attributes, whether the individual is in possession of the item.

In an embodiment, at 231, the relationship manager determines that the individual has become dispossessed of the item based on a prior determination that the individual was possessed of the item combined with results from processing the image with the attributes. In an embodiment, a shopping cart may include an item identifier and the shopping cart was assigned to a person identifier, such that when the relationship manager processes the image with the attributes and with this prior association and determines therefrom that the person (individual) is no longer possessed (dispossessed of the item).

According to an embodiment, at 240, the relationship manager provides an individual identifier for the individual, an item identifier for the item, and an indication that the individual was determined to be in possession of the item to a transaction manager for updating a shopping cart maintained for the individual with the item identifier. In an embodiment, the transaction manager is the transaction manager 124.

Figure 3:
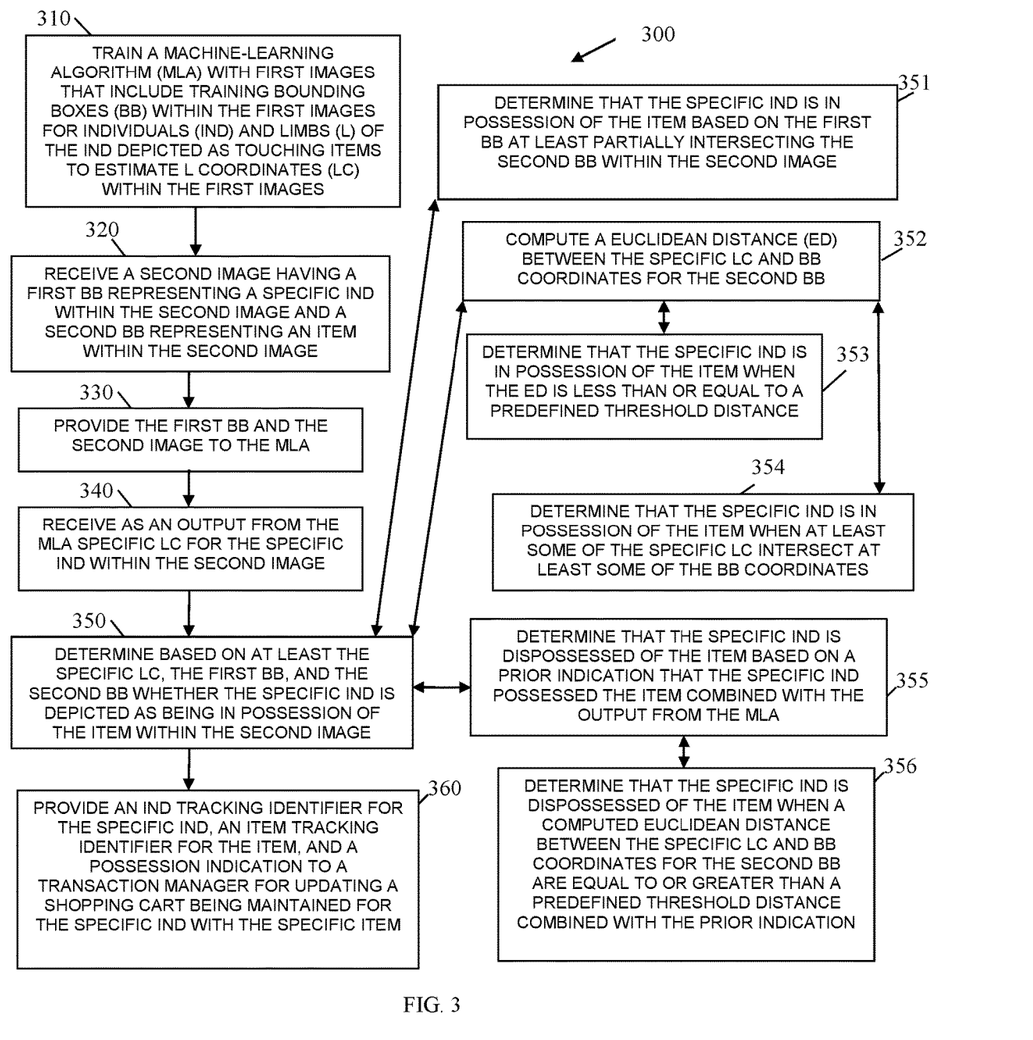
FIG. 3 is a diagram of another method for image processing to determine relationships between tracked objects, according to an example embodiment.

FIG. 3 is a diagram of another method 300 for image processing to determine relationships between tracked objects, according to an example embodiment. The software module(s) that implements the method 300 is referred to as a "possession/dispossession determiner." The possession/dispossession determiner is implemented as executable instructions programmed and residing within memory and/or a non-transitory computer-readable (processor-readable) storage medium and executed by one or more processors of a device. The processors that execute the possession/dispossession determiner are specifically configured and programmed to process the possession/dispossession determiner. The possession/dispossession determiner has access to one or more network connections during its processing. The network connections can be wired, wireless, or a combination of wired and wireless.

In an embodiment, the device that executes the possession/dispossession determiner is the server 120. In an embodiment, the server 120 is a cloud processing environment.

In an embodiment, the possession/dispossession determiner is all of or some combination of: the item tracker 121, the person tracker 122, the item-person relationship manager 123, the transaction manager 124, and/or the method 200.

The possession/dispossession determiner presents another and in some ways enhanced processing perspective of the method 200 discussed above.

At 310, the possession/dispossession determiner trains a machine-learning algorithm with first images that include training bounding boxes within the first images for individuals and limbs of the individuals depicted as touching items to estimate limb coordinates for limbs of the individuals within the first images.

At 320, the possession/dispossession determiner receives a second image having a first bounding box representing a specific individual within the second image and a second bounding box representing an item within the second image.

At 330, the possession/dispossession determiner provides the first bounding box and the second image to the trained machine-learning algorithm.

At 340, the possession/dispossession determiner receives as an output from the machine-learning algorithm specific limb coordinates for the specific individual represented within the second image.

At 350, the possession/dispossession determiner determines based on at least the specific limb coordinates, the first bounding box, and the second bounding box whether the specific individual is depicted as being in possession of the item within the second image.

In an embodiment, at 351, the possession/dispossession determiner determines that the specific individual is in possession of the item based on the first bounding box at least partially intersecting the second bounding box within the second image.

In an embodiment, at 352, the possession/dispossession determiner computes a Euclidean distance between the specific limb coordinates and bounding box coordinates for the second bounding box that represents the item within the image.

In an embodiment of 352, at 353, the possession/dispossession determiner determines that the specific individual is in possession of the item when the Euclidean distance is less than or equal to a predefined threshold distance.

In an embodiment of 352, at 354, the possession/dispossession determiner determines that the specific individual is in possession of the item when at least some of the specific limb coordinates intersect at least some of the bounding box coordinates for the second bounding box.

In an embodiment, at 355, the possession/dispossession determiner determines that the specific individual is dispossessed of the item based on a prior indication that the specific individual possessed the item combined with the output from the trained machine-learning algorithm.

In an embodiment of 355, at 356, the possession/dispossession determiner determines that the specific individual is dispossessed of the item when a computed Euclidean distance between the specific limb coordinates and bounding box coordinates for the second bounding box are equal to or greater than a predefined threshold distance combined with the prior indication, which indicated that the specific individual was previously in possession of the item.

In an embodiment, at 360, the possession/dispossession determiner provides an individual tracking identifier for the specific individual, an item tracking identifier for the item, and a possession indication to a transaction manager for updating a shopping cart being maintained for the specific individual with the specific item.

Figure 4:
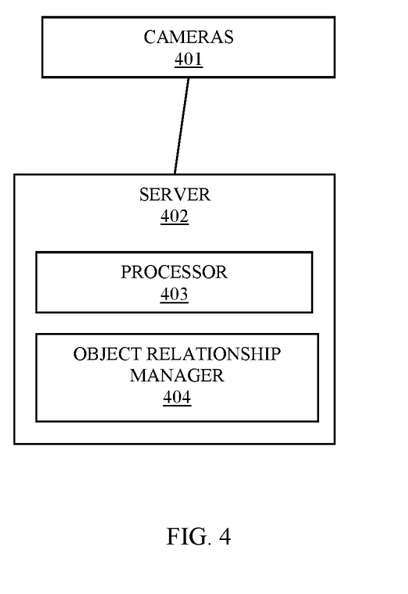
FIG. 4 is a diagram of a system for image processing to determine relationships between tracked objects, according to an example embodiment.

FIG. 4 is a diagram of a system 400 for image processing to determine relationships between tracked objects, according to an example embodiment. The system 400 includes a variety of hardware components and software components. The software components of the system 400 are programmed and reside within memory and/or a non-transitory computer-readable medium and execute on one or more processors of the system 400. The system 400 communicates over one or more networks, which can be wired, wireless, or a combination of wired and wireless.

In an embodiment, the system 400 implements, inter alia, the processing described above with the FIGS. 1-3 with respect to the server 120 and the cameras 110.

In an embodiment, system 400 is the cameras 110 and the server 120.

The system 400 includes a plurality of cameras 401 and a server 402. The server 402 includes at least one hardware processor 403 and configured to execute executable instructions from a non-transitory computer-readable storage medium as an object relationship manager 404.

The object relationship manager 404 when executed from the non-transitory computer-readable storage medium on the processor 403 is configured to: 1) receive a first bounding box for a first object detected within an image; 2) receive a second bounding box for a second object detected within the image; 3) determine whether the first bounding box at least partially intersects the second bounding box within the image as a first determination; 4) identify first object appendages that extend beyond the first bounding box within the image; 5) determine whether any of the first object appendages at least partially intersect the second bounding box as a second determination; and 6) provide a relationship between the first object and the second object based on the first determination and the second determination.

In an embodiment, the object relationship manager 404 is further configured to process a trained machine-learning algorithm to identify the first object appendages from the image.

In an embodiment, the object-relationship manager 404 is all or some combination of: the item tracker 121, the person tracker 122, the item-person relationship manager 123, the method 200, and/or the method 300.

In an embodiment, the system 400 is deployed as a portion of a frictionless store implementation where customers (individuals) shop through computer-vision and image processing and items and individuals are associated with one another with a shopping cart maintained for each individual. Each individual can checkout and pay for his/her shopping cart items using any of the above-referenced techniques discussed with the FIG. 1.

In an embodiment, the system 400 is deployed as a real-time security system within an enterprise.

In an embodiment, the system 400 is deployed as a combination frictionless store and real-time security system.

In an embodiment, the objects are real-world structures captured and depicted within the images. In an embodiment, at least one object is a depicted human within the images. In an embodiment, at least one object is a depicted retail good within the images. In an embodiment, at least one object is a depicted animal within the images. In an embodiment, at least one object is a depicted scene within the image associated with weather or a natural disaster.

In an embodiment, configured rules are processed by object relationship manager 404 based on the first determination and the second determination to provide the relationship.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising:
   receiving an image that depicts an individual and an item;
   obtaining attributes associated with the individual and the item, wherein obtaining further includes obtaining the attributes as a first bounding box defining a first position of the individual within the image and a second bounding box defining a second position of the item within the image, identifying a limb for the individual based on the first bounding box, wherein identifying further includes passing the first bounding box to a trained machine-learning algorithm and receiving back limb coordinates as output from the trained machine learning algorithm, wherein identifying further includes computing a Euclidean distance represented in the image between the limb coordinates and second bounding box coordinates for the second bounding box, wherein computing further includes determining that the individual is in possession of the item when the Euclidean distance is less than or equal to a predefined threshold distance; and
   determining, based on processing the image with the attributes, whether the individual is in possession of the item;
   providing an individual identifier for the individual, an item identifier for the item, and an indication that the individual was determined to be in possession of the item to a transaction manager for updating a shopping cart maintained for the individual.

2. The method of claim 1, wherein obtaining the first bounding box further includes determining that the first bounding box intersects the second bounding box within the image.

3. The method of claim 2, wherein determining further includes determining that the individual is in possession of the item based on the first bounding box intersecting the second bounding box within the image.

4. The method of claim 1, wherein determining further includes determining that the individual has dispossessed the item based on a prior determination that the individual was possessed of the item combined with results from processing the image with the attributes.

5. A method, comprising:
   training a machine-learning algorithm with first images comprising training bounding boxes within the first images for individuals and limbs of the individuals depicted as touching items to estimate limb coordinates within the first images;
   receiving a second image having a first bounding box representing a specific individual within the second image and a second bounding box representing an item within the second image;
   providing the first bounding box and the second image to the machine-learning algorithm;
   receiving as an output from the machine-learning algorithm specific limb coordinates for the specific individual within the second image; and
   determining based on at least the specific limb coordinates, the first bounding box, and the second bounding box whether the specific individual is depicted as being in possession of the item within the second image, wherein determining further includes computing a Euclidean distance between the specific limb coordinates and bounding box coordinates for the second bounding box, wherein computing further includes determining that the specific individual is in possession of the item when the Euclidean distance is less than or equal to a predefined threshold distance.

6. The method of claim 5 further comprising providing an individual tracking identifier for the specific individual, an item tracking identifier for the item, and a possession indication to a transaction manager for updating a shopping cart being maintained for the specific individual with the specific item.

7. The method of claim 5, wherein determining further includes determining that the specific individual is in possession of the item based on the first bounding box at least partially intersecting the second bounding box within the second image.

8. The method of claim 5, wherein determining further includes determining that the specific individual is in possession of the item when at least some of the specific limb coordinates intersect at least some of the bounding box coordinates.

9. The method of claim 5, wherein determining further includes determining that the specific individual is dispossessed of the item based on a prior indication that the specific individual possessed the item combined with the output from the machine-learning algorithm.

10. The method of claim 5, wherein determining further includes determining that the specific individual is dispossessed of the item when a second computed Euclidean distance between the specific limb coordinates and the bounding box coordinates for the second hounding box are equal to or greater than a predefined threshold distance combined with the prior indication.

\* \* \* \* \*